(12) United States Patent
Kawabata et al.

(10) Patent No.: US 8,995,666 B2
(45) Date of Patent: Mar. 31, 2015

(54) KEY SCHEDULING DEVICE AND KEY SCHEDULING METHOD

(75) Inventors: Takeshi Kawabata, Tokyo (JP); Koichi Fujisaki, Kanagawa (JP); Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 13/425,858

(22) Filed: Mar. 21, 2012

(65) Prior Publication Data

US 2012/0237035 A1 Sep. 20, 2012

Related U.S. Application Data

(63) Continuation of application No. PCT/JP2009/066536, filed on Sep. 24, 2009.

(51) Int. Cl.
*G06F 21/00* (2013.01)
*H04L 9/06* (2006.01)

(52) U.S. Cl.
CPC ......... *H04L 9/0631* (2013.01); *H04L 2209/122* (2013.01); *H04L 2209/24* (2013.01)
USPC ........... 380/277; 380/259; 380/278; 380/279; 713/171

(58) Field of Classification Search
CPC .. H04L 9/0625; H04L 9/0631; H04L 2209/24
USPC .................. 380/259–266, 277–279; 713/171; 726/1–36; 705/71
See application file for complete search history.

(56) References Cited

U.S. PATENT DOCUMENTS

| 6,769,063 B1 * | 7/2004 | Kanda et al. .................. 713/193 |
| 2002/0159599 A1 * | 10/2002 | Matsui et al. ................. 380/263 |

(Continued)

FOREIGN PATENT DOCUMENTS

| JP | 8-30195 A | 2/1996 |
| JP | 10-154976 A | 6/1998 |
| JP | 2005-503069 A | 1/2005 |
| JP | 2005-522912 A | 7/2005 |

OTHER PUBLICATIONS

Goce Jakimoski et al., Chaos and Cryptography: Block Encryption Ciphers Based on Chaotic Maps, Feb. 2001, IEEE, vol. 48, No. 2, pp. 163-169.*

(Continued)

*Primary Examiner* — Bradley Holder
*Assistant Examiner* — Fahimeh Mohammadi
(74) *Attorney, Agent, or Firm* — Oblon, McClelland, Maier & Neustadt, L.L.P.

(57) ABSTRACT

According to one embodiment, in a key scheduling device, a non-linear transformation unit non-linearly transforms at least one of partial keys resulting from dividing an expanded key. A first linear transformation unit includes first and second circuits. The second circuit linearly transforms the partial key by directly using a transformation result from the non-linear transformation unit. A first storage stores the partial key linearly transformed by the first linear transformation unit. A second linear transformation unit linearly transforms, inversely to the first linear transformation unit, each of partial keys other than the partial key linearly transformed by the second circuit out of the partial keys stored in the first storage, and outputs inversely transformed partial keys. A second storage stores one of inputs to the second circuit. An outputting unit connects the respective inversely transformed partial keys and the input stored in the second storage to be output as a second key.

5 Claims, 10 Drawing Sheets

(56) References Cited

U.S. PATENT DOCUMENTS

| | | | |
|---|---|---|---|
| 2003/0059044 A1* | 3/2003 | Shimizu et al. ................. | 380/37 |
| 2004/0091107 A1* | 5/2004 | Fujisaki et al. ................. | 380/42 |
| 2004/0101135 A1* | 5/2004 | Kanamaru ..................... | 380/28 |
| 2005/0021990 A1 | 1/2005 | Liardet et al. | |
| 2005/0111659 A1* | 5/2005 | Shirai et al. .................... | 380/37 |
| 2006/0104438 A1 | 5/2006 | Giraud | |
| 2008/0056490 A1* | 3/2008 | Akishita et al. ................ | 380/44 |
| 2010/0002872 A1* | 1/2010 | Shibutani et al. .............. | 380/28 |
| 2010/0135490 A1* | 6/2010 | Kwon et al. ................... | 380/236 |

OTHER PUBLICATIONS

Raphael C.-W. Phan, Impossible differential cryptanalysis of 7-round Advanced Encryption Standard (AES), Jul. 16, 2004, Science Direct, pp. 33-38.*

Liu Niansheng et al., AES Algorithm Implemented for PDA Secure Communication with Java, Apr. 16-18, 2007, IEEE, pp. 217-222.*

Namin Yu et al., Investigation of Compact Hardware Implementation of the Advanced Encryption Standard, May 1-4, 2005, IEEE, pp. 1069-1072.*

International Search Report mailed on Nov. 2, 2009 for International Application No. PCT/JP09/066536, filed on Sep. 24, 2009 (English).

International Written Opinion mailed on Nov. 2, 2009 for International Application No. PCT/JP09/066536, filed on Sep. 24, 2009.

Karri, Ramesh et al. "Concurrent Error Detection Schemes for Fault-Based Side-Channel Cryptanalysis of Symmetric Block Ciphers." IEEE Transactions on Computer Aided-Design of Integrated Circuits and Systems. vol. 21. No. 12, Dec. 2002.

* cited by examiner

KEY SCHEDULING DEVICE AND KEY SCHEDULING METHOD

CROSS-REFERENCE TO RELATED APPLICATIONS

This application is a continuation of PCT international application Ser. No. PCT/JP2009/066536 filed on Sep. 24, 2009, which designates the United States; the entire contents of which are incorporated herein by reference.

FIELD

Embodiments described herein relate generally to generation of a key for use in verification of encryption processes and decryption processes.

BACKGROUND

One of encryption schemes commonly used in recent years is a scheme in which a block cipher is employed such as the Advanced Encryption Standard (AES). For the block cipher, a key scheduler to which a key is input and from which a plurality of expanded keys is output and a scrambler that scrambles input data are often provided, and the scrambler performs arithmetic processes such as permutation and inversion of input data using the expanded keys respectively in a plurality of rounds.

When arithmetic processes are performed in each of the rounds, a method of detecting an error by performing verification in each round can be applied. If a circuit for verification is provided for performing verification in each round, the arithmetic processes and the verification processes can be performed in parallel, an arithmetic operation result is determined with an overhead of one round, and encryption and decryption processes including the verification can be performed at high speed. "Concurrent Error Detection Schemes for Fault-based Side-Channel Cryptanalysis of Symmetric Block Cipher", IEEE Transactions on Computer-Added Design of Integrated circuit and Systems, VO. 21 No. 12, December 2002 reports various error detecting methods to be applied to the block cipher.

It is desired that encryption devices and decryption devices have high processing speeds and small sizes. For verification that is a countermeasure to an error during arithmetic operation for encryption and decryption, a register that holds or generates arithmetic operation results for comparison with verification results is needed. In addition, a register having the same size as an expanded key storing register is needed so as to store expanded keys to be used for the verification, which hinders the circuit from being reduced in size.

DETAILED DESCRIPTION

Figure 1:
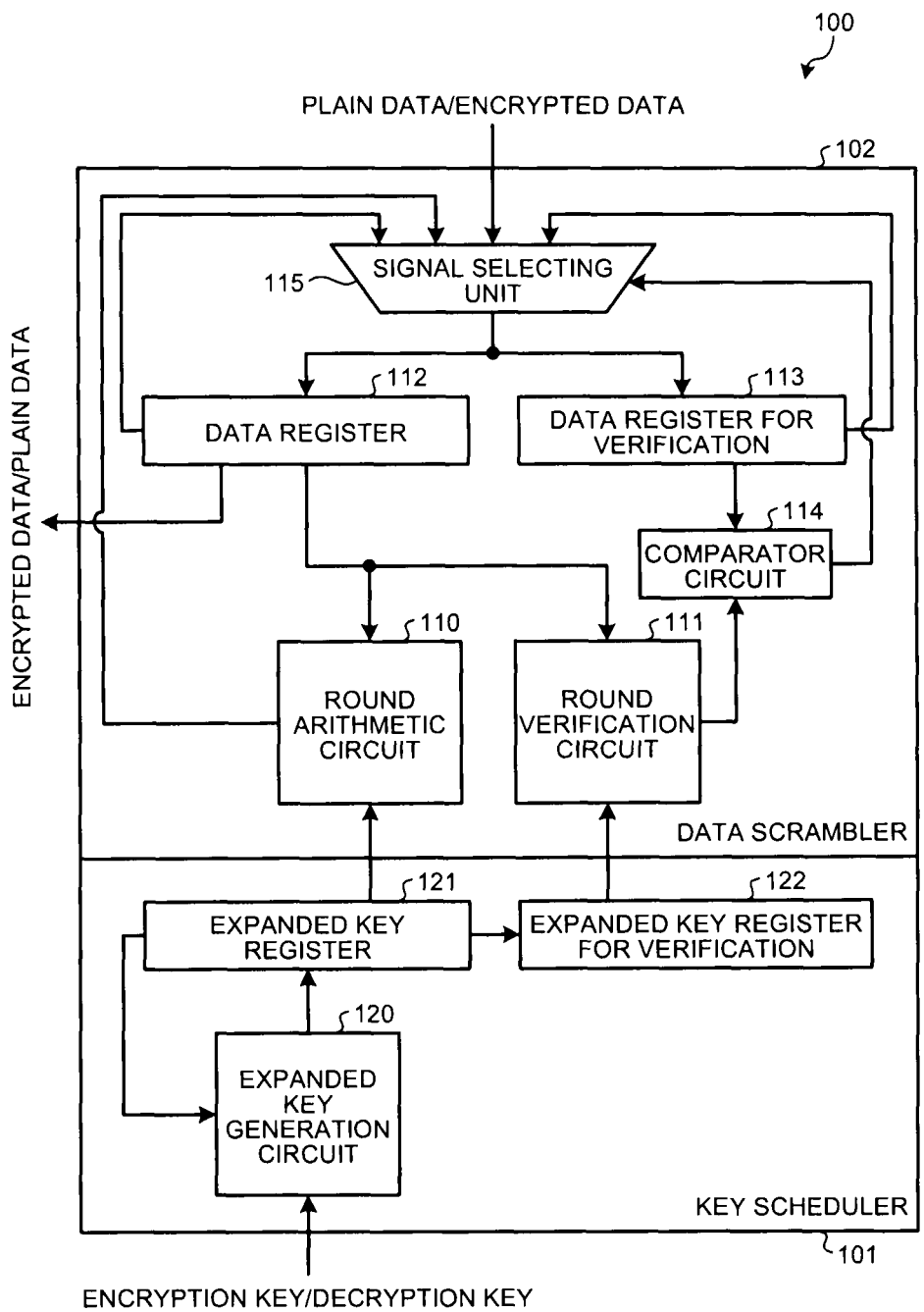
FIG. 1 is a diagram illustrating a basic configuration of an arithmetic device in a case where verification is performed through heterogeneous processing.

In general, according to one embodiment, in a key scheduling device, a non-linear transformation unit non-linearly transforms at least one of partial keys resulting from dividing an expanded key. A first linear transformation unit includes first and second circuits. The second circuit linearly transforms the partial key by directly using a transformation result from the non-linear transformation unit. A first storage stores the partial key linearly transformed by the first linear transformation unit. A second linear transformation unit linearly transforms, inversely to the first linear transformation unit, each of partial keys other than the partial key linearly transformed by the second circuit out of the partial keys stored in the first storage, and outputs inversely transformed partial keys. A second storage stores one of inputs to the second circuit. An outputting unit connects the respective inversely transformed partial keys and the input stored in the second storage to be output as a second key.

Embodiment of an arithmetic device, method and program will be described below in detail with reference to the accompanying drawings. Note that in this embodiment, encryption and decryption are performed according to an encryption scheme employing a block cipher typified by the Advanced Encryption Standard (AES). In the block cipher scheme applied to this embodiment, an encryption device and a decryption device each include a key scheduler to which a key is input and from which a plurality of expanded keys is output, and a data scrambler that scrambles input data. The data scrambler performs arithmetic processes such as permutation and inversion of input data by using the expanded keys respectively in a plurality of rounds.

<Outline of Verification for Encryption and Decryption Processes>

First, an outline of error detection of arithmetic data obtained by arithmetic operation in the encrypting processes and the decrypting processes, which can be applied to this embodiment, will be described.

Examples of methods for detecting an error in arithmetic data in an encryption device and a decryption device include a method of detecting an error by adding a parity to data under arithmetic operation and a method of performing verification. With the method of adding a parity out of these methods, the input bit length becomes longer and existing systems are required to be modified if an encryption device and a decryption device that performs error detection by adding a parity are applied to the existing systems.

On the other hand, with the method of detecting an error by verification, the input bit length does not change and an encryption device and a decryption device to which verification functions are added can be relatively easily applied to existing systems. In this embodiment, the verification method is employed for error detection of arithmetic data obtained by arithmetic operation in the encryption processes and the decryption processes.

Furthermore, a method of performing verification after the whole arithmetic processes are finished and a method of performing verification in each round in an encryption device or a decryption device may be considered as the verification method. Out of these methods, the method of performing verification after the whole arithmetic processes are finished requires twice as much time until an arithmetic operation result is determined as a case where verification is not performed. This is because arithmetic processes and verification processes are performed for an input of one block. This method is therefore not suitable for a system with which high speed processing is required.

With the method of performing verification processes in each round, on the other hand, data arithmetic processes and verification processes can be performed in parallel if a circuit for verification is provided separately from an arithmetic circuit for performing encryption and decryption processes. In this case, an arithmetic operation result is determined with an overhead of one round, and encryption or decryption processes including the verification can be performed at higher speed.

Note that the verification for arithmetic operation of encryption or decryption processes can be performed through heterogeneous processing using processes different from the arithmetic operation or through homogeneous processing using the same type of processes as the arithmetic operation.

In heterogeneous processing, the verification of arithmetic operation of encryption processes is performed by arithmetic operation of decryption processes associated with the encryption processes. Similarly, the verification of arithmetic operation of decryption processes is performed by arithmetic operation of encryption processes. When the verification is performed through heterogeneous processing, the encryption device or the decryption device includes two types of circuits that are an encryption circuit and a decryption circuit. Accordingly, when verification is performed through heterogeneous processing, one device can be configured to perform both of encryption and decryption processes.

In homogeneous processing, on the other hand, verification of arithmetic operation of encryption processes is performed by the same arithmetic operation of encryption processes. Similarly, the verification of arithmetic operation of decryption processes is performed by the same arithmetic operation of decryption processes. When the verification is performed through homogeneous processing, the encryption device or the decryption device includes a plurality of circuits of one type that is either an encryption circuit or a decryption circuit according to the purpose of the device. Accordingly, when verification is performed through homogeneous processing, the throughput can be increased in a state where verification is not used.

First, a case where verification is performed through heterogeneous processing will be described. FIG. 1 is an example of a basic configuration of an encryption device or a decryption device with verification functions in a case where verification is performed through heterogeneous processing. Note that since the encryption device and the decryption device can be implemented by the same configuration, the encryption device and the decryption device are hereinafter collectively referred to as an arithmetic device unless otherwise stated.

An arithmetic device 100 illustrated in FIG. 1 performs the same arithmetic processes a plurality of times to encrypt plain data or decrypt encrypted data. When the arithmetic device 100 functions as an encryption device, plain data of a predetermined length and an encryption key of a predetermined length are input thereto, and the arithmetic device 100 encrypts the input plain data using the encryption key and outputs encrypted data of a predetermined length. When the arithmetic device 100 functions as a decryption device, encrypted data of a predetermined length and a decryption key of a predetermined length are input thereto, and the arithmetic device 100 decrypts the input encrypted data and outputs plain data of a predetermined length. The arithmetic device 100 also has verification functions for encryption or decryption.

Note that the plain data or the encrypted data and the encryption key or the decryption key input to the arithmetic device 100, and the number of repetition of the arithmetic processes are determined by the encryption or decryption scheme applied to the arithmetic device 100. In addition, the arithmetic device 100 includes a controller (not illustrated) acting on respective units of the arithmetic device 100 to control the whole operation thereof.

The arithmetic device 100 includes a key scheduler 101 and a data scrambler 102. The key scheduler 101 generates an expanded key based on an encryption key or a decryption key (these keys will be hereinafter collectively referred to as a "key" unless otherwise stated) input from outside. The key scheduler 101 also generates a new expanded key based on the expanded key generated thereby.

The data scrambler 102 performs arithmetic operation on the plain data or the encrypted data input from outside as input data by using the expanded keys generated by the key scheduler 101 to scramble the input data (when the arithmetic device 100 is an encryption device). When the arithmetic device 100 is a decryption device, the data scrambler 102 performs arithmetic operation inverse to that for encryption by using the expanded keys to restore scrambled data. The data scrambler 102 also has a function of verifying arithmetic operation using expanded keys.

The data scrambling in encryption and the processing for restoring scrambled data in decryption are hereinafter collectively referred to as data scrambling unless otherwise stated.

The key scheduler 101 and the data scrambler 102 operate in synchronization with each other, and each time a new expanded key is generated by the key scheduler 101, data scrambling is performed once by the data scrambler 102. One series of processes including generating a new expanded key by the key scheduler 101 and data scrambling using the expanded key by the data scrambler 102 is referred to as one round. Operations of the arithmetic device 100 in each round are controlled by the aforementioned controller, for example.

First, the key scheduler 101 will be described. The key scheduler 101 includes, in this basic configuration, an expanded key generation circuit 120, an expanded key register 121, and an expanded key register for verification 122.

Figure 2:
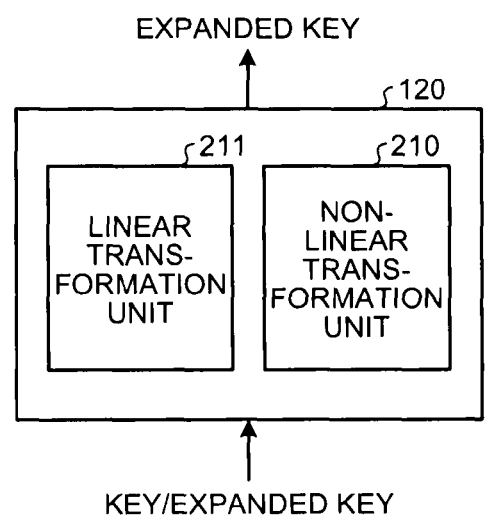
FIG. 2 is a diagram schematically illustrating an expanded key generation circuit.

The expanded key generation circuit 120 includes a linear transformation unit 211 configured to perform linear transformation and a non-linear transformation unit 210 configured to perform non-linear transformation as schematically illustrated in FIG. 2, for example, and performs linear transformation or non-linear transformation on an input key or expanded key to generate a new expanded key.

Note that linear originally means that superposition is possible, and when a certain function $f(x)$ is assumed and a function $f(ax+by)=af(x)+bf(y)$ is satisfied, the function (x) is linear. For example, transformation using addition and subtraction is linear. As another example, transformation using an exclusive OR satisfies the aforementioned condition and is thus linear since the same output value can be obtained when the order of the transformation is changed. On the other hand, transformation carried out by referring to a table in which values are randomly assigned using an input value as an index to obtain an output value does not satisfy the aforementioned condition and is thus non-linear since the relation between the input value and the output value is not uniform, and a different output value is obtained if the order of the transformation is changed, for example.

The expanded key generation circuit 120 performs linear transformation and non-linear transformation on a key supplied from outside or an expanded key stored in the expanded key register 121 to generate an expanded key. The expanded key generated by the expanded key generation circuit 120 is stored in the expanded key register 121, whereby the expanded key register 121 is updated. The expanded key register for verification 122 can store the same bit length as the expanded key register 121, and is updated as a result of storing an expanded key supplied from the expanded key register 121.

Figure 3:
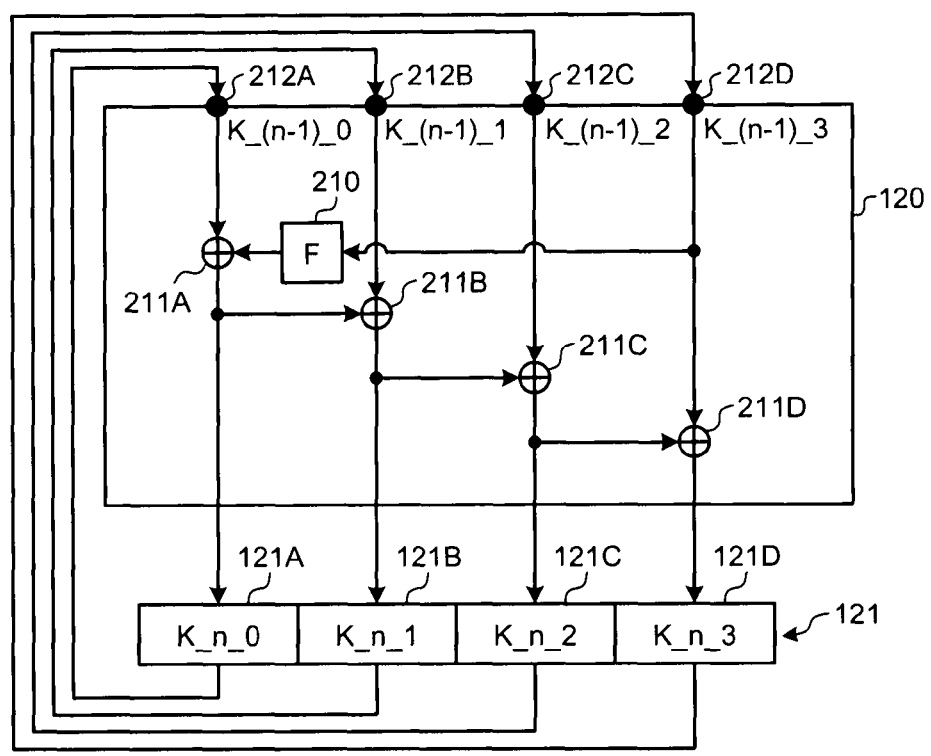
FIG. 3 is a diagram illustrating a configuration of the expanded key generation circuit.

FIG. 3 is a block diagram illustrating an exemplary configuration of the expanded key generation circuit 120. The expanded key generation circuit 120 illustrated in FIG. 3 is an example of a configuration in which generation of an expanded key according to the AES is performed by an expanded key generation circuit and an expanded key register. The expanded key generation circuit 120 includes a non-linear transformation circuit 210 (represented by "F" in the example of FIG. 3) configured to perform non-linear transformation and exclusive OR circuits 211A, 211B, 211C and 211D configured to perform linear transformation. Note that the exclusive OR circuits 211A, 211B, 211C and 211D in FIG. 3 correspond to the linear transformation unit 211 described with reference to FIG. 2.

An expanded key at the (n−1)-th round is divided into four and input to input terminals 212A, 212B, 212C and 212D, respectively, of the expanded key generation circuit 120. Here, a key (encryption key or decryption key) in the initial state is assumed to be an expanded key at the 0-th round (that is, n=1). In this example, an expanded key having a bit length of 128 bits at the (n−1)-th round is divided into four parts each having a bit length of 32 bits. In this case, the value of the expanded key at the (n−1)-th round is represented by a value $K\_(n-1)$, the values of the partial keys obtained by dividing the expanded key into four are represented by values $K\_(n-1)\_0$, $K\_(n-1)\_1$, $K\_(n-1)\_2$ and $K\_(n-1)\_3$, respectively.

These values $K\_(n-1)\_0$, $K\_(n-1)\_1$, $K\_(n-1)\_2$ and $K\_(n-1)\_3$ are input to one input terminals of the exclusive OR circuits 211A, 211B, 211C and 211D through the input terminals 212A, 212B, 212C and 212D of the expanded key generation circuit 120, respectively. In addition, the value $K(n-1)\_3$ is input to the non-linear transformation circuit 210. The value $K(n-1)\_3$ is subjected to non-linear transformation in the non-linear transformation circuit 210, and input to the other input terminal of the exclusive OR circuit 211A.

Note that the non-linear transformation circuit 210 performs non-linear transformation on the input data to non-linearly scramble the data. A substitution box (S-BOX) that is a table given in advance, for example, is used as the non-linear transformation circuit 210. In a typical example using the S-BOX, when the data length of input data is assumed to be 16 bits, a table is referred to using 8 bits from the MSB and 8 bits from the LSB, and the input data are transformed to output data of 16 bits different from the input data. The S-BOX generally has a large size occupying a large portion of the configuration of the arithmetic device 100.

The exclusive OR circuit 211A calculates an exclusive OR of the value $K\_(n-1)\_0$ input to one input terminal thereof and data resulting from non-linear transformation of the value $K\_(n-1)\_3$ input to the other input terminal thereof, and outputs a value $K\_n\_0$. The value $K\_n\_0$ is stored in a region 121A of the expanded key register 121 and input to the other input terminal of the exclusive OR circuit 211B.

The exclusive OR circuit 211B calculates an exclusive OR of the value $K\_(n-1)\_1$ input to one input terminal thereof and the value $K\_0$ input to the other input terminal thereof, and outputs a value $K\_n\_1$. The value $K\_n\_1$ is stored in a region 121B of the expanded key register 121 and input to the other input terminal of the exclusive OR circuit 211C. The exclusive OR circuit 211C calculates an exclusive OR of the value $K\_(n-1)\_2$ input to one input terminal thereof and the value $K\_n\_1$ input to the other input terminal thereof, and outputs a value $K\_n\_2$. The value $K\_n\_2$ is stored in a region 121C of the expanded key register 121 and input to the other input terminal of the exclusive OR circuit 211D. The exclusive OR circuit 211D calculates an exclusive OR of the value $K\_(n-1)\_3$ input to one input terminal thereof and the value $K\_n\_2$ input to the other input terminal thereof, and outputs a value $K\_n\_3$. The value $K\_n\_3$ is stored in a region 121D of the expanded key register 121.

In this manner, the values $K\_n\_0$, $K\_n\_1$, $K\_n\_2$ and $K\_n\_3$ output from the exclusive OR circuits 211A, 211B, 211C and 211D, respectively, are input to the regions 121A, 121B, 121C and 121D of the expanded key register 121. Specifically, a value $K\_n$ of an expanded key at the n-th round can be represented by the value $K\_n=\{K\_n\_0, K\_n\_1, K\_n\_2, K\_n\_3\}$ resulting from bit connecting of the values $K\_n\_0$, $K\_n\_1$, $K\_n\_2$ and $K\_n\_3$. In other words, the value $K\_n$ of the expanded key at the n-th round is generated by connecting the values $K\_n\_0$, $K\_n\_1$, $K\_n\_2$ and $K\_n\_3$.

The values $K\_n\_0$, $K\_n\_1$, $K\_n\_2$ and $K\_n\_3$ stored in the expanded key register 121 are input as the values $K\_(n-1)\_0$, $K\_(n-1)\_1$, $K\_(n-1)\_2$ and $K\_(n-1)\_3$ to the input terminals 212A, 212B, 212C and 212D to generate an expanded key of the next round.

Referring back to FIG. 1, description is made on an outline of operations of the key scheduler 101. First, a key (encryption key or decryption key) is supplied to the expanded key generation circuit 120. The expanded key generation circuit 120 performs linear transformation through the exclusive OR circuits 211A to 211B and non-linear transformation through the non-linear transformation circuit 210 on the supplied key as described above as processes in the first round to generate the values $K\_n\_0$, $K\_n\_1$, $K\_n\_2$ and $K\_n\_3$ of the expanded key. The generated values $K\_n\_0$, $K\_1$, $K\_2$ and $K\_3$ are stored in the regions 121A to 121D of the expanded key register 121, respectively, whereby the expanded key register 121 is updated.

In the next round, the expanded key (values $K\_n\_0$, $K\_n\_1$, $K\_n\_2$ and $K\_n\_3$) stored in the expanded key register 121 is stored as an expanded key for verification in the expanded key register for verification 122, whereby the expanded key register for verification 122 is updated. Subsequently, the expanded key generation circuit 120 performs linear transformation and non-linear transformation on the expanded key stored in the expanded key register 121 to generate an expanded key of the second round. The expanded key register for verification 122 is updated by the expanded key of the first round stored in the expanded key register 121, and subsequently, the expanded key register 121 is updated with the expanded key of the second round generated by the expanded key generation circuit 120.

Thereafter, generation of an expanded key by using an expanded key stored in the expanded key register 121 performed by the expanded key generation circuit 120, update of the expanded key register for verification 122 with an expanded key of one round before stored in the expanded key register 121, and update of the expanded key register 121 with an expanded key of the current round generated by the expanded key generation circuit 120 are repeated a predetermined number of rounds. That is, an expanded key of one round before with respect to an expanded key stored in the expanded key register 121 is stored as an expanded key for verification in the expanded key register for verification 122.

Next, the data scrambler 102 will be described. The data scrambler 102 includes a round arithmetic circuit 110, a round verification circuit 111, a data register 112, a data register for verification 113, a comparator circuit 114 and a signal selecting unit 115.

Plain data to be encrypted or encrypted data to be decrypted (hereinafter collectively referred to as data to be processed) and outputs from the round arithmetic circuit 110, the data register 112 and the data register for verification 113 are input to the signal selecting unit 115. The signal selecting unit 115 selects data for updating the data register 112 and the data register for verification 113, which will be described later, from the input data in response to an output signal from the comparator circuit 114.

The data register 112 and the data register for verification 113 are updated with data output from the signal selecting unit 115. Although details will be given later, the data register for verification 113 is updated by data of one round before held in the data register 112. The data register 112 is updated after the data register for verification 113 is updated. Thus, data of one round before with respect to data stored in the data register 112 are stored in the data register for verification 113.

The round arithmetic circuit 110 reads out an expanded key from the expanded key register 121 of the key scheduler 101 described above, and performs one round of predetermined arithmetic processes on the data held in the data register 112. The arithmetic operation result is supplied to the signal selecting unit 115.

Note that when the arithmetic device 100 functions as an encryption device, the round arithmetic circuit 110 performs one round of encryption processes on data stored in the data register 112 according to a predetermined encryption scheme by using the expanded key read from the expanded key register 121.

On the other hand, when the arithmetic device 100 functions as a decryption device, the round arithmetic circuit 110 performs one round of decryption processes on data stored in the data register 112 according to a predetermined encryption scheme by using the expanded key read from the expanded key register 121. Hereinafter, arithmetic operation of the encryption processes and decryption processes performed by the round arithmetic circuit 110 will be collectively referred to as arithmetic processes unless otherwise stated.

The round verification circuit 111 reads out an expanded key from the expanded key register for verification 122 of the key scheduler 101 described above and performs one round of verification processes on data stored in the data register 112. The verification result is supplied to the comparator circuit 114.

Note that the verification processes of the round verification circuit 111 are performed by arithmetic operation inverse to that of the round arithmetic circuit 110. Specifically, when the arithmetic device 100 functions as an encryption device, the round verification circuit 111 performs arithmetic operation of one round of decryption processes on data stored in the data register 112 for verification through arithmetic operation according to the predetermined encryption scheme performed by the round arithmetic circuit 110 by using the expanded key for verification read from the expanded key register for verification 122.

On the other hand, if the arithmetic device 100 functions as a decryption device, the round verification circuit 111 performs arithmetic operation of one round of encryption processes on data stored in the data register 112 as verification processes according to the predetermined encryption scheme with which the decryption processes performed by the round arithmetic circuit 110 described above are associated. Hereinafter, arithmetic operation in the decryption processes and encryption processes performed by the round verification circuit 111 will be collectively referred to as verification processes.

In this manner, the round verification circuit 111 performs arithmetic processes for returning the result of arithmetic processes performed by the round arithmetic circuit 110 by one round to perform verification.

The comparator circuit 114 compares an output from the round verification circuit 111 and data stored in the data register for verification 113. If the output and the data are coincident as a result of the comparison, the comparator circuit 114 determines that the arithmetic processes of the round arithmetic circuit 110 are successful, and controls the signal selecting unit 115 to perform arithmetic operation of the next round. On the other hand, if the output and the data are not coincident as a result of the comparison, the comparator circuit 114 determines that an error has occurred in the arithmetic processes of the round arithmetic circuit 110, and controls the signal selecting unit 115 to stop arithmetic operation of subsequent rounds.

Figure 4:
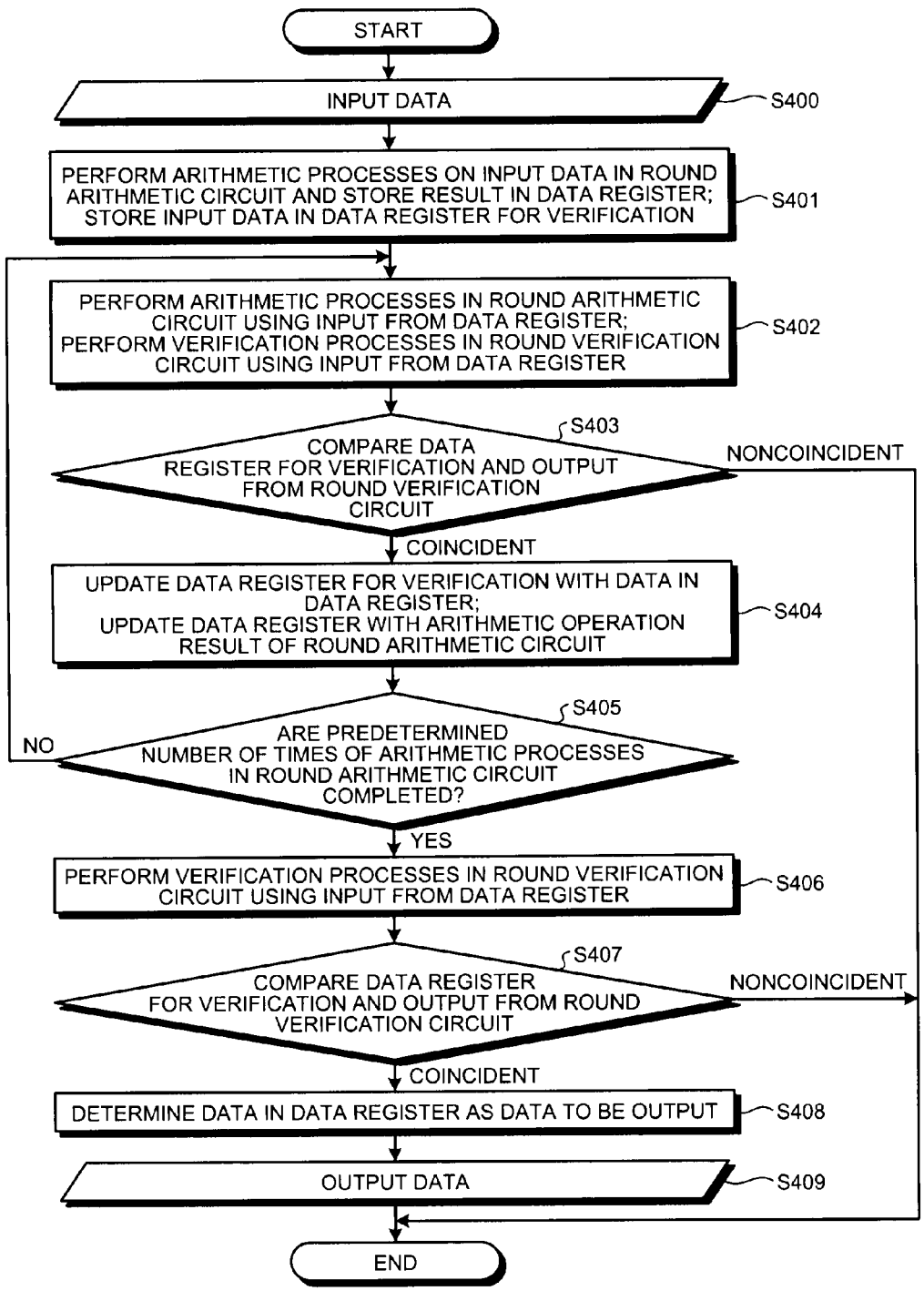
FIG. 4 is a flowchart illustrating processes in a case where verification is performed through heterogeneous processing.

FIG. 4 is an exemplary flowchart illustrating arithmetic processes and verification processes of the data scrambler 102 in a case where verification is performed through heterogeneous processing. Note that the processes illustrated in FIG. 4 are those when the number of rounds determined according to the encryption scheme or the decryption scheme is R (R>2). A current number of rounds is counted by a counter, which is not illustrated, included in the data scrambler 102, for example.

In a first step S400, data to be processed are input to the arithmetic device 100 and supplied to the signal selecting unit 115. In addition, although not illustrated, a key is input to the arithmetic device 100 and supplied to the expanded key generation circuit 120. The expanded key generation circuit 120 performs the linear transformation and the non-linear transformation described above on the input key to generate an expanded key. The expanded key is stored in the expanded key register 121.

In a next step S401, the signal selecting unit 115 stores the data to be processed in the data register 112 and the data register for verification 113. Then, the round arithmetic circuit 110 performs arithmetic processes of the first round on the data to be processed stored in the data register 112 by using the expanded key stored in the expanded key register 121. The result of arithmetic operation by the round arithmetic circuit 110 is stored in the data register 112 via the signal selecting unit 115, whereby the data register 112 is updated.

In the key scheduler 101, the expanded key stored in the expanded key register 121 is stored as an expanded key for verification in the expanded key register for verification 122, and the expanded key generation circuit 120 generates a new expanded key by using the expanded key stored in the expanded key register 121. The generated new expanded key is stored in the expanded key register 121, whereby the expanded key register 121 is updated.

In a next step S402, the round arithmetic circuit 110 receives the data stored in the data register 112 as an input and performs arithmetic processes of the second round by using the expanded key stored in the expanded key register 121. In addition, in step S402, the round verification circuit 111 receives the data stored in the data register 112 as an input and performs verification processes by using the expanded key stored in the expanded key register for verification 122.

The verification processes performed by the round verification circuit 111 are processes inverse to the arithmetic processes performed by the round arithmetic circuit 110. In addition, the expanded key stored in the expanded key register for verification 122 is an expanded key of one round before with respect to the expanded key stored in the expanded key register 121. Accordingly, as a result of the verification by the round verification circuit 111, the data stored in the data register 112 are returned to those of one round before. The result of verification by the round verification circuit 111 is supplied to the comparator circuit 114.

In a next step S403, the comparator circuit 114 compares a verification result supplied from the round verification circuit 111 and the data stored in the data register for verification 113, and determines whether or not the result and the data are coincident with each other. If it is determined that the result and the data are not coincident, it is deemed that an error has occurred in the arithmetic processes and the series of processes ends. On the other hand, if it is determined that the result and the data are coincident, the process proceeds to step S404.

In step S404, the signal selecting unit 115 stores the data in the data register 112 in the data register for verification 113 to update the data register for verification 113, and stores the result of arithmetic operation performed by the round arithmetic circuit 110 in step S402 described above in the data register 112 to update the data register 112.

In addition, in the key scheduler 101, the expanded key stored in the expanded key register 121 is stored as an expanded key for verification in the expanded key register for verification 122. In addition, the expanded key generation circuit 120 generates a new expanded key by using the expanded key stored in the expanded key register 121. The new expanded key is stored in the expanded key register 121, whereby the expanded key register 121 is updated.

In a next step S405, it is determined whether or not the a predetermined number of times ((R−1) times in this example) of arithmetic processes by the round arithmetic circuit 110 are completed by means of a counter that is not illustrated, for example. If it is determined that the arithmetic processes have not been completed, the process returns back to step S402, and processes of the next round are performed.

On the other hand, if it is determined in step S405 that the predetermined number of times of arithmetic processes in the round arithmetic circuit 110 are completed, the process proceeds to step S406. In step S406, the round verification circuit 111 receives the data stored in the data register 112 as an input and performs verification processes by using the expanded key for verification stored in the expanded key register for verification 122. The result of the verification processes is supplied to the comparator circuit 114.

In a next step S407, the comparator circuit 114 compares the verification result supplied from the round verification circuit 111 and the data stored in the data register for verification 113, and determines whether or not the result and the data are coincident with each other. If it is determined that the result and the data are not coincident, it is deemed that an error has occurred in the arithmetic processes and the series of processes ends. On the other hand, if it is determined that the result and the data are coincident, the process proceeds to step S408.

In step S408, the data stored in the data register 112 are determined to be data to be output, and in step S409, the data to be output are output from the arithmetic device 100.

Note that the processes in the flowchart of FIG. 4 can be applied whether the arithmetic device 100 is an encryption device configured to encrypt plain data or a decryption device configured to decrypt encrypted data. Specifically, the processes in the flowchart of FIG. 4 can be applied both in a case where the round arithmetic circuit 110 performs arithmetic operation for encryption and the round verification circuit 111 performs arithmetic operation for associated decryption and in a case where the round arithmetic circuit 110 performs arithmetic operation for decryption and the round verification circuit 111 performs arithmetic operation for encryption. In this case, the operations of the key scheduler 101 are the same whether the arithmetic device 100 is an encryption device or a decryption device.

Figure 5:
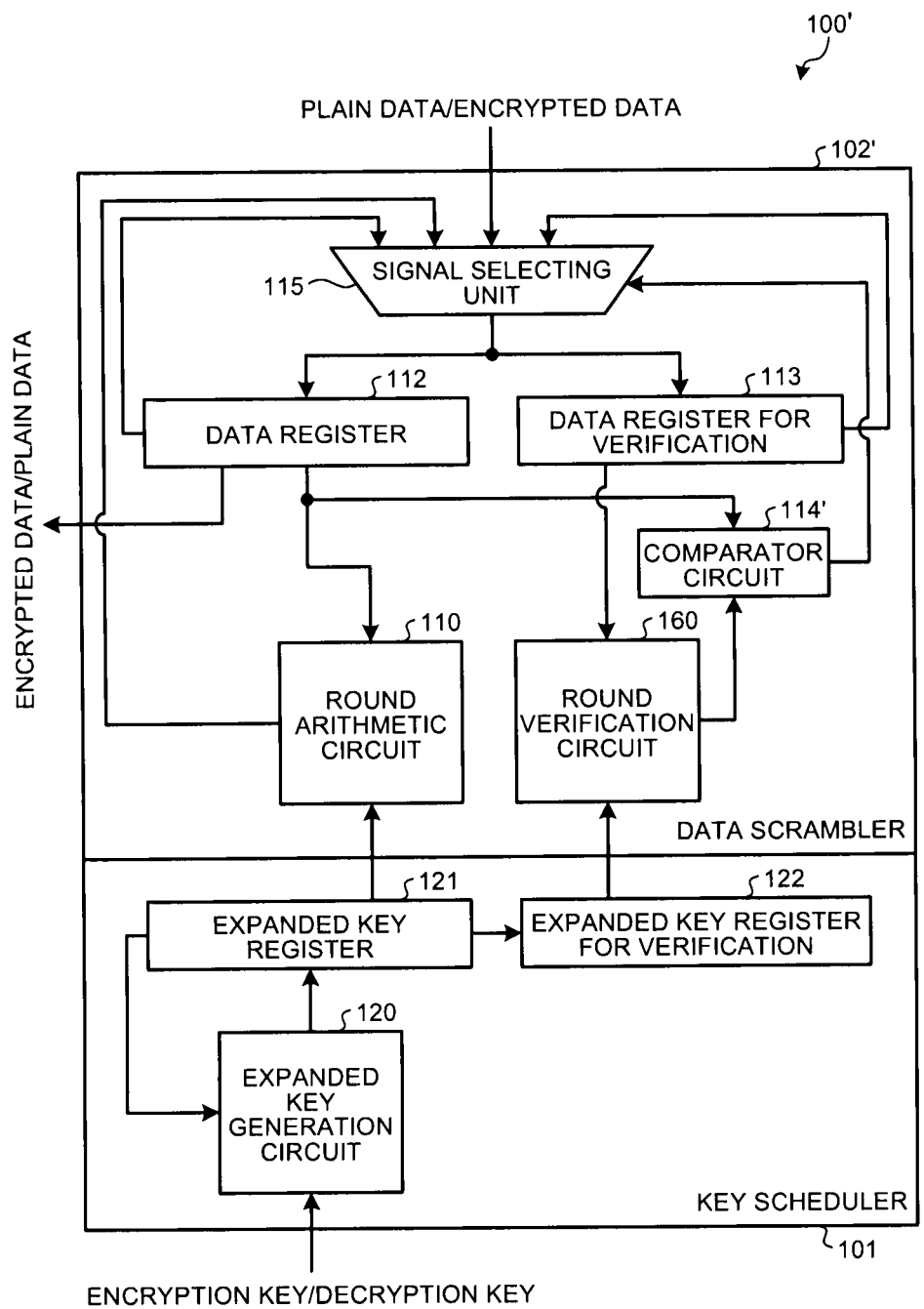
FIG. 5 is a diagram illustrating a basic configuration of an arithmetic device in a case where verification is performed through homogeneous processing.

Next, a case where verification is performed through homogeneous processing will be described. FIG. 5 is an example of a basic configuration of an encryption device or a decryption device with verification functions in a case where verification is performed through homogeneous processing. Note that since the encryption device and the decryption device can be implemented by the same configuration even in the case where verification is performed through homogeneous processing, the encryption device and the decryption device are hereinafter collectively referred to as an arithmetic device unless otherwise stated.

An arithmetic device 100' illustrated in FIG. 5 performs the same arithmetic processes a plurality of times to encrypt plain data or decrypt encrypted data similarly to the arithmetic device 100 illustrated in FIG. 1. The arithmetic device 100' has verification functions for encryption or decryption similarly to the arithmetic device illustrated in FIG. 1. Note that parts that are the same as those in FIG. 1 described above will be designated by the same reference numerals in FIG. 5 and the detailed description thereof will not be repeated.

The arithmetic device 100' includes a key scheduler 101 and a data scrambler 102'. Since exactly the same configuration and operations as in the case of heterogeneous processing described with reference to FIGS. 1 to 3 can be applied to the key scheduler 101, the description thereof will not be repeated here.

In the data scrambler 102', a round verification circuit 160 is supplied with an expanded key from the expanded key register for verification 122, also receives data stored in the data register 112 as an input and performs the same arithmetic operation as the round arithmetic circuit 110. Specifically, when the arithmetic device 100' functions as an encryption device, the round verification circuit 160 performs arithmetic operation according to the same predetermined encryption scheme as the arithmetic processes performed in the round arithmetic circuit 110 by using the expanded key for verification supplied from the expanded key register for verification 122.

In addition, also in the case where the arithmetic device 100' functions as a decryption device, the round verification circuit 160 performs arithmetic operation for decryption processes according to the same predetermined encryption scheme as the arithmetic processes performed in the round arithmetic circuit 110 by using the expanded key for verification supplied from the expanded key register for verification 122.

The result of verification by the round verification circuit 160 is supplied to a comparator circuit 114'. The comparator circuit 114' compares the verification result supplied from the round verification circuit 160 and the data stored in the data register 112. If the result and the data are coincident as a result of the comparison, the comparator circuit 114' determines that the arithmetic processes of the round arithmetic circuit 110 are successful, and controls the signal selecting unit 115 to perform arithmetic operation of the next round. On the other hand, if the result and the data are not coincident as a result of the comparison, the comparator circuit 114' determines that an error has occurred in the arithmetic processes of the round arithmetic circuit 110, and controls the signal selecting unit 115 to stop arithmetic operation of subsequent rounds.

Figure 6:
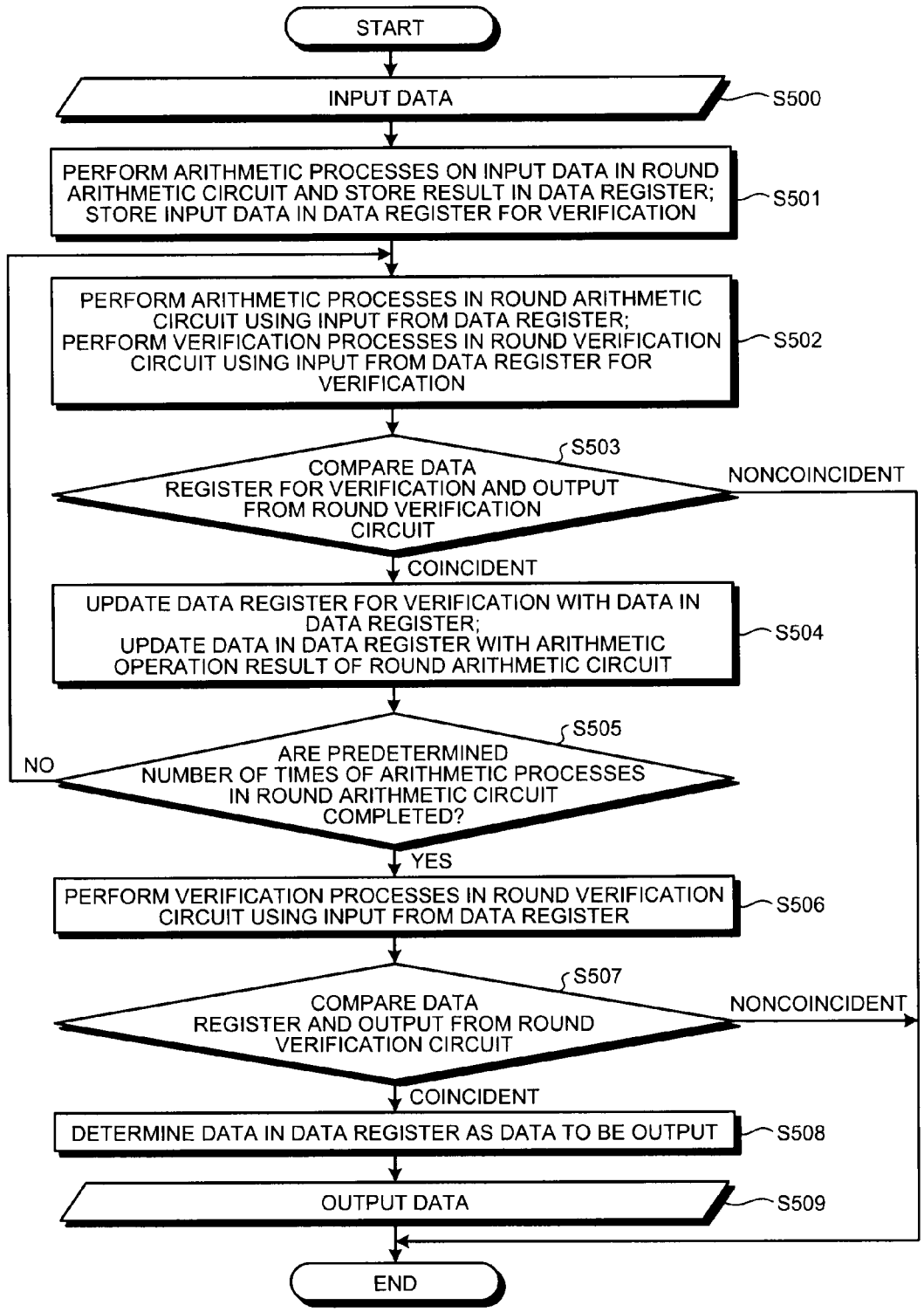
FIG. 6 is a flowchart illustrating processes in a case where verification is performed through homogeneous processing.

FIG. 6 is an exemplary flowchart illustrating arithmetic processes and verification processes of the data scrambler 102' in a case where verification is performed through homogeneous processing. Note that the processes illustrated in FIG. 6 are those when the number of rounds determined according to the encryption scheme or the decryption scheme is R (R>2). A current number of rounds is counted by a counter, which is not illustrated, included in the data scrambler 102', for example.

In a first step S500, data to be processed are input to the arithmetic device 100' and supplied to the signal selecting unit 115. In addition, although not illustrated, a key is input to the arithmetic device 100' and supplied to the expanded key generation circuit 120. The expanded key generation circuit 120 performs the linear transformation and the non-linear transformation described above on the input key to generate an expanded key. The expanded key is stored in the expanded key register 121.

In a next step S501, the signal selecting unit 115 stores the data to be processed in the data register 112 and the data register for verification 113. Then, the round arithmetic circuit 110 performs arithmetic processes of the first round on the data to be processed stored in the data register 112 by using the expanded key stored in the expanded key register 121. The result of arithmetic operation by the round arithmetic circuit 110 is stored in the data register 112 via the signal selecting unit 115, whereby the data register 112 is updated.

In the key scheduler 101, the expanded key stored in the expanded key register 121 is stored as an expanded key for verification in the expanded key register for verification 122. Then, the expanded key generation circuit 120 generates a new expanded key by using the expanded key stored in the expanded key register 121. The generated new expanded key is stored in the expanded key register 121, whereby the expanded key register 121 is updated.

In a next step S502, the round arithmetic circuit 110 receives the data stored in the data register 112 as an input and performs arithmetic processes of the second round by using the expanded key stored in the expanded key register 121. In addition, in step S502, the round verification circuit 160 receives the data stored in the data register for verification 113 as an input and performs verification processes by using the expanded key stored in the expanded key register for verification 122.

The verification processes performed by the round verification circuit 160 are the same processes as the arithmetic processes performed by the round arithmetic circuit 110. Meanwhile, the expanded key for verification stored in the expanded key register for verification 122 is an expanded key of one round before with respect to the expanded key stored in the expanded key register 121. In addition, data of one round before are stored in the data register for verification 113. Therefore, the same arithmetic operation as those performed one round before in the round arithmetic circuit 110 is performed by the verification in the round verification circuit 160. The result of verification by the round verification circuit 160 is supplied to the comparator circuit 114'.

In a next step S503, the comparator circuit 114' compares a verification result supplied from the round verification circuit 160 and the data stored in the data register 112, and determines whether or not the result and the data are coincident with each other. In this case, since the data register 112 is not updated with the arithmetic operation result of the round arithmetic circuit 110 in step S502, the arithmetic operation result of the first round is stored therein. If it is determined that the result and the data are not coincident, it is deemed that an error has occurred in the arithmetic processes and the series of processes ends. On the other hand, if it is determined that the result and the data are coincident, the process proceeds to step S504.

In step S504, the signal selecting unit 115 stores the data in the data register 112 in the data register for verification 113 to update the data register for verification 113. In addition, in step S504, the result of the arithmetic operation performed by the round arithmetic circuit 110 in step S502 described above is supplied to the signal selecting unit 115. The signal selecting unit 115 stores the supplied arithmetic operation result in the data register 112 to update the data register 112.

In addition, in the key scheduler 101, the expanded key stored in the expanded key register 121 is stored as an expanded key for verification in the expanded key register for verification 122. In addition, the expanded key generation circuit 120 generates a new expanded key by using the expanded key stored in the expanded key register 121. The new expanded key is stored in the expanded key register 121, whereby the expanded key register 121 is updated.

In a next step S505, it is determined whether or not a predetermined number of times ((R−1) times in this example) of arithmetic processes by the round arithmetic circuit 110 are completed by means of a counter that is not illustrated, for example. If it is determined that the arithmetic processes have not been completed, the process returns back to step S502, and processes of the next round are performed.

On the other hand, if it is determined in step S505 that the predetermined number of times of arithmetic processes in the round arithmetic circuit 110 are completed, the process proceeds to step S506. In step S506, the round verification circuit 160 receives the data stored in the data register for verification 113 as an input and performs verification processes by using the expanded key for verification stored in the expanded key register for verification 122. The result of the verification processes is supplied to the comparator circuit 114'.

In a next step S507, the comparator circuit 114' compares a verification result supplied from the round verification circuit 160 and the data stored in the data register 112, and determines whether or not the result and the data are coincident with each other. If it is determined that the result and the data are not coincident, it is deemed that an error has occurred in the arithmetic processes and the series of processes ends. On the other hand, if it is determined that the result and the data are coincident, the process proceeds to step S508.

In step S508, the data stored in the data register 112 are determined to be data to be output, and in step S509, the data to be output are output from the arithmetic device 100'.

Note that the processes in the flowchart of FIG. 6 can be applied whether the arithmetic device 100' is an encryption device configured to encrypt plain data or a decryption device configured to decrypt encrypted data. Specifically, the processes in the flowchart of FIG. 6 can be applied both in a case where the round arithmetic circuit 110 and the round verification circuit 160 perform arithmetic operation for encryption and in a case where the round arithmetic circuit 110 and the round verification circuit 160 perform arithmetic operation for decryption. In this case, the operations of the key scheduler 101 are the same whether the arithmetic device 100' is an encryption device or a decryption device.

<Arithmetic Device with Verification Functions According to This Embodiment>

Next, an arithmetic device with verification functions according to this embodiment will be described. As will be appreciated from the operations of the key scheduler 101 described above and the operations of the data scrambler 102 (or the data scrambler 102') described with reference to the flowcharts of FIGS. 4 and 6, the arithmetic processes of the round arithmetic circuit 110 and the verification processes of the round verification circuit 111 (or the round verification circuit 160) are performed in a manner different by one round. Accordingly, the arithmetic device 100 (or the arithmetic device 100') needs to hold expanded keys for two rounds in the registers.

Note that, as already described with reference to FIGS. 4 and 6, arithmetic processes and the verification processes are performed at timings corresponding to each other in the arithmetic device 100 performing verification through heterogeneous processing and the arithmetic device 100' performing verification through homogeneous processing. Therefore, to avoid complication, the arithmetic device 100 and the arithmetic device 100' will be described in the following using the arithmetic device 100 as representative unless otherwise stated.

Figure 7:
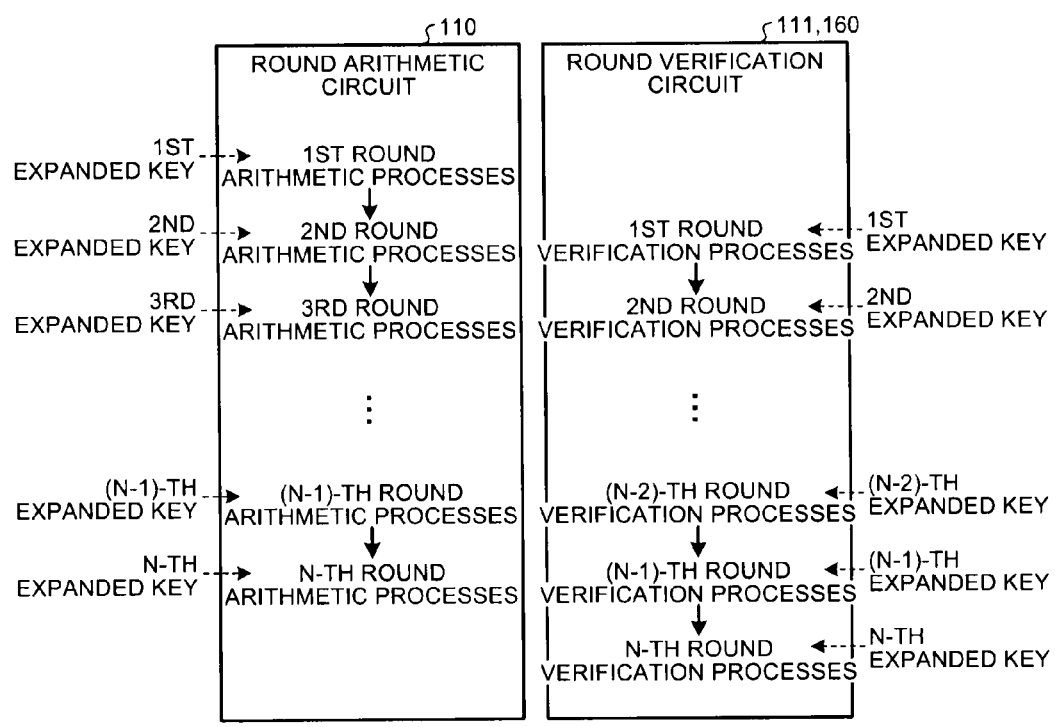
FIG. 7 is a diagram explaining relationship between arithmetic processes and verification processes.

The relation between the arithmetic processes and the verification processes will be described in more detail with reference to FIG. 7. First, in processes of the first round, arithmetic processes of the first round using a first expanded key are performed in the round arithmetic circuit 110. Next, in processes of the second round, arithmetic processes of the second round using a second expanded key are performed in the round arithmetic circuit 110 and verification processes for the arithmetic processes of the first round using the first expanded key are performed in the round verification circuit 111. Thus, for the processes of the second round, the arithmetic device 100 needs to hold the first expanded key for verification and the second expanded key for arithmetic operation.

In processes of the third round, arithmetic processes of the third round using a third expanded key are performed in the round arithmetic circuit 110 and verification processes for the arithmetic processes of the second round using the second expanded key are performed in the round verification circuit 111. Thus, for the processes of the third round, the arithmetic device 100 needs to hold the second expanded key for verification and the third expanded key for arithmetic operation.

Subsequently, in processes of the n-th round (not illustrated), arithmetic processes of the n-th round using an expanded key of the n-th round are performed in the round arithmetic circuit 110 and verification processes for the arithmetic processes of the (n−1)-th round using the (n−1)-th expanded key are performed in the round verification circuit 111 in a similar manner. As described above, arithmetic operation and verification are respectively performed using expanded keys different by one round from each other in the round arithmetic circuit 110 and the round verification circuit 111.

In processes of the N-th round that is a final round, arithmetic processes of the N-th round using an expanded key of the N-th round are performed in the round arithmetic circuit 110 and verification processes for the arithmetic processes of the (N−1)-th round using the (N−1)-th expanded key are performed in the round verification circuit 111. Then, finally, verification processes of the N-th round using the N-th expanded key are performed on the arithmetic operation result of the N-th round in the round verification circuit 111, and if the verification result is successful, the arithmetic operation result of the N-th round is output as correct encrypted data or plain data from the arithmetic device 100.

As described above, the arithmetic device 100 needs to hold two expanded keys per each round in the registers except for the first round and the N-th round that is the final round.

In this embodiment, a linear transformation circuit configured to perform processes inverse to those of the linear transformation unit 200 of the expanded key generation circuit 120 is added to the key scheduler 101 of the arithmetic device 100 or the arithmetic device 100' illustrated in FIG. 1 or FIG. 5. Consequently, the capacities of the registers holding the expanded keys are reduced.

Figure 8:
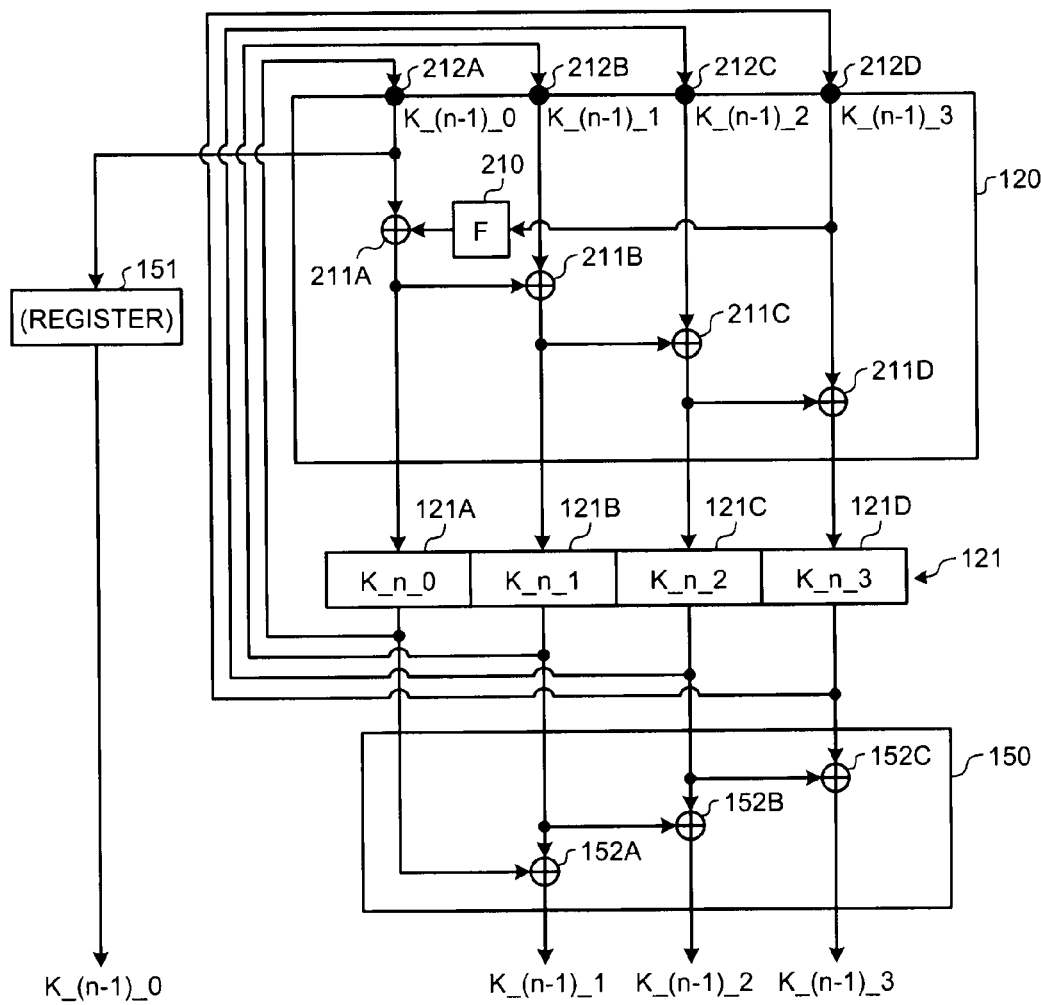
FIG. 8 is a diagram illustrating a configuration of a key scheduler according to an embodiment.

FIG. 8 illustrates an example of a key scheduler 140 according to this embodiment to which the linear transformation circuit is added. The configuration described with reference to FIG. 3 can be applied without any change to the configuration of the expanded key generation circuit 120 and the connection between the expanded key generation circuit 120 and the expanded key register 121 of the key scheduler 140 according to this embodiment. Note that parts that are the same as those in FIG. 3 described above will be designated by the same reference numerals in FIG. 8 and the detailed description thereof will not be repeated.

Values K_(n−1)_0, K_(n−1)_1, K_(n−1)_2 and K_(n−1)_3 obtained by dividing the expanded key of the (n−1)-th round into four are input to the input terminals 212A, 212B, 212C and 212D, respectively, of the expanded key generation circuit 120, and expanded key generating processes are performed. As a result of the processes, values K_n_0, K_n_1, K_n_2 and K_n_3 of a new expanded key are generated, and stored in the regions 121A, 121B, 121C and 121D, respectively, of the expanded key register 121.

In FIG. 8, if arithmetic operation from the expanded key register 121 back to the input terminals 212A, 212B, 212C and 212D of the expanded key generation circuit 120 can be performed, the arithmetic operation of the (n−1)—the round becomes possible. Accordingly, verification processes using the expanded key of the (n−1)-th round as the expanded key for verification can be performed even if all of the expanded keys of the (n−1)-th round are not held in the n-th round.

Accordingly, in this embodiment, a circuit that can recover the values K_n_0, K_n_1, K_n_2 and K_n_3 stored in the expanded key register 121 to values of the previous round is provided in the key scheduler 101. In this case, a reversible arithmetic circuit having small circuit size is used as this circuit.

More specifically, a linear transformation circuit 150 having exclusive OR circuits 152A, 152B and 152C is provided as illustrated in FIG. 8. Then, the values K_n_0, K_n_1, K_n_2 and K_n_3 stored in the regions 121A, 121B, 121C and 121D of the expanded key register 121 are input to the input terminals of the exclusive OR circuits 152A, 152B and 152C, respectively.

More specifically, the value K_n_0 stored in the region 121A and the value K_n_1 stored in the region 121B of the expanded key register 121 are respectively input to one and the other input terminals of the exclusive OR circuit 152A. In addition, the value K_n_1 stored in the region 121B and the value K_n_2 stored in the region 121C of the expanded key register 121 are respectively input to one and the other input terminals of the exclusive OR circuit 152B. Furthermore, the value K_n_2 stored in the region 121C and the value K_n_3 stored in the region 121D of the expanded key register 121 are respectively input to one and the other input terminals of the exclusive OR circuit 152C.

In the configuration of FIG. 8, the value K_n_1 stored in the region 121B can be regarded as an exclusive OR of the value K_n_0 stored in the region 121A and the value K_(n−1)_1 input to the input terminal 212B. Therefore, because of the property of an exclusive OR, the value K_(n−1)_1 input to the input terminal 212B can be obtained by calculating an exclusive OR of the value K_n_1 and the value K_n_0.

The same is applicable to the value K_n_2 stored in the region 121C and the value K_n_3 stored in the region 121D. The value K_n_2 stored in the region 121C can be regarded as an exclusive OR of the value K_n_1 stored in the region 121B and the value K_(n−1)_2 input to the input terminal 212C, and the value K_(n−1)_2 input to the input terminal 212C can be obtained by calculating an exclusive OR of the value K_n_2 and the value K_n_1. In addition, the value K_n_3 stored in the region 121D can be regarded as an exclusive OR of the value K_n_2 stored in the region 121C and the value K_(n−1)_3 input to the input terminal 212D, and the value K_(n−1)_3 input to the input terminal 212D can be obtained by calculating an exclusive OR of the value K_n_3 and the value K_n_2.

In this manner, the values K_(n−1)_1, K_(n−1)_2, and K_(n−1)_3 composing an expanded key of the (n−1)-th round can be obtained by calculating exclusive ORs using the values K_n_0, K_n_1, K_n_2 and K_n_3 of an expanded key of the n-th round stored in the regions 121A to 121D of the expanded key register 121.

On the other hand, the value K_(n−1)_0 input to the input terminal 212A is subjected to arithmetic operation including non-linear transformation by the non-linear transformation circuit 210. In this case, a circuit for performing inverse transformation of the non-linear circuit 210 needs to be provided so as to obtain the value K_(n−1)_0 from the values stored in the expanded key register 121. The circuit performing inverse transformation of the non-linear circuit 210 has a configuration equivalent to that of the non-linear circuit 210 and also a circuit size equal to that of the non-linear circuit 210, and is thus inappropriate for the subject matter of this embodiment.

Therefore, in this embodiment, an expanded key register for verification 151 is provided and connected to one of the inputs of the exclusive OR circuit 211A that directly performs linear transformation on the transformation result from the non-linear circuit 210. In the example of FIG. 8, the expanded key register for verification 151 is connected to one input terminal, that is the input terminal 212A, of the exclusive OR circuit 211A. The value K_(n−1)_0 input to the input terminal 212A in the (n−1)-th round is stored in the expanded key register for verification 151. Accordingly, it is sufficient that the expanded key register for verification 151 have a capacity allowing the value K_(n−1)_0 to be stored. In this example, it is sufficient that the expanded key register for verification 151 have a capacity of one fourth of that of the expanded key register 121.

In the n-th round, the value K_(n−1)_0 stored in the expanded key register for verification 151 and the values K_(n−1)_1, K_(n−1)_2 and K_(n−1)_3 that are outputs from the exclusive OR circuits 152A to 152C of the linear transformation circuit 150 are bit-connected to generate an expanded key of the (n−)-th round having the value K_(n−1), namely the expanded key for verification of the (n−1)-th round.

Although it is described referring to FIG. 8 that the expanded key register for verification 151 is connected to an input of the expanded key generation circuit 120, this is equivalent to that the expanded key register for verification 151 is connected to the region 121A of the expanded key register 121. In this case, at a timing when an expanded key is read out from the expanded key register 121, for example, the data in the region 121A of the expanded key register 121 are stored in the expanded key register for verification 151, whereby the expanded key register for verification 151 is updated.

Figure 9:
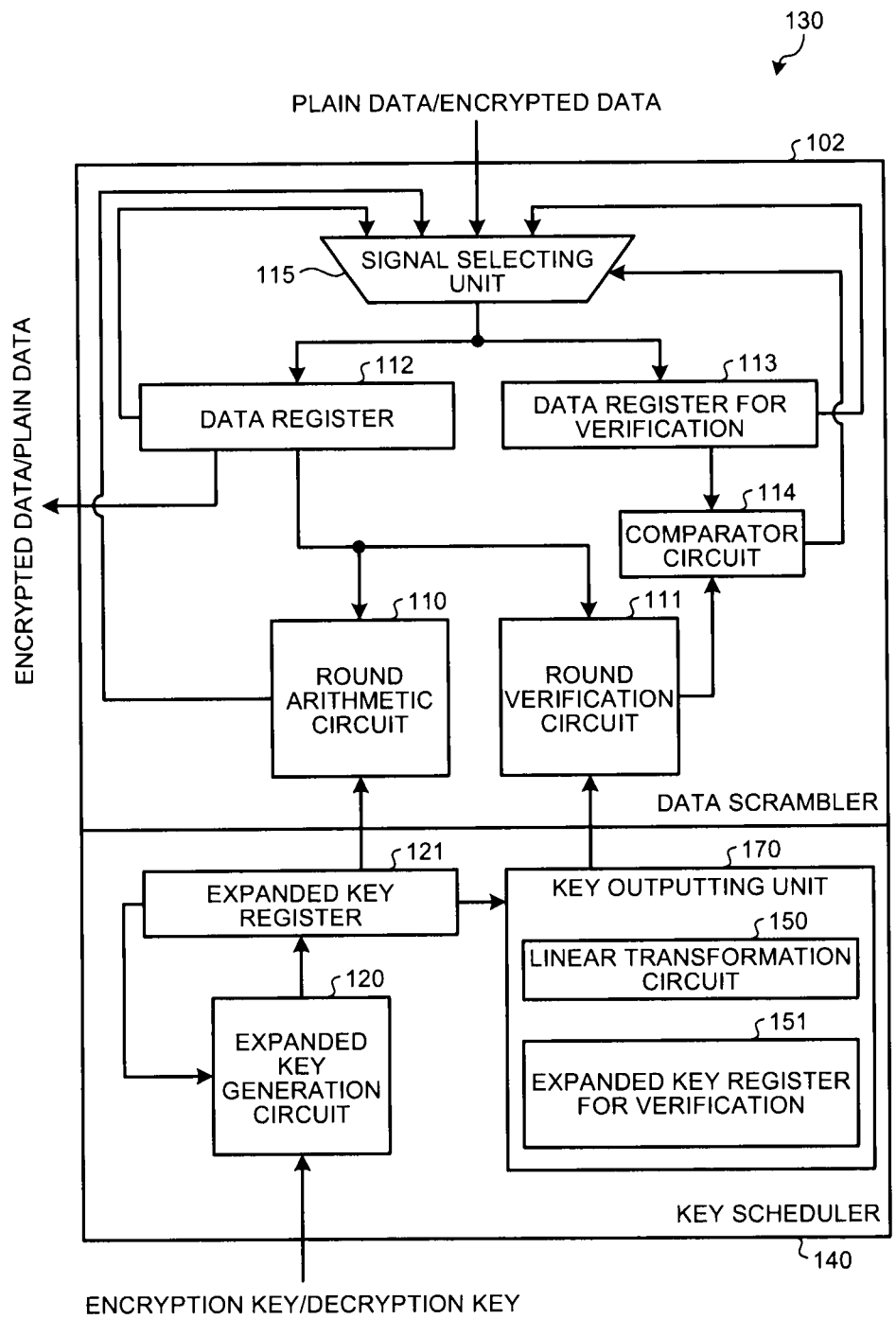
FIG. 9 is a diagram illustrating an example in which the key scheduler according to the embodiment is applied to the arithmetic device.

FIG. 9 illustrates an example in which the key scheduler 140 according to this embodiment illustrated in FIG. 8 is applied to the arithmetic device 100 illustrated in FIG. 1 described above in place of the key scheduler 101. Note that parts that are the same as those in FIG. 1 described above will be designated by the same reference numerals in FIG. 9 and the detailed description thereof will not be repeated.

An arithmetic device 130 illustrated in FIG. 9 includes the data scrambler 102 and the key scheduler 140. In the key scheduler 140, the linear transformation circuit 150 and the expanded key register for verification 151 are collectively referred to as a key outputting unit 170. Thus, the key outputting unit 170 bit-connects the value K_(n−1)_0 stored in the expanded key register for verification 151 for verification and the values K_(n−1)_1, K_(n−1)_2, and K_(n−1)_3 that are outputs from the linear transformation circuit 150, and outputs the resulting expanded key as an expanded key for verification.

The round arithmetic circuit 110 of the data scrambler 102 reads out an expanded key of the n-th round from the expanded key register 121 of the key scheduler 140 and performs one round of arithmetic processes. On the other hand, the round verification circuit 111 performs verification processes using the value K_(n−1), which is obtained by bit-connecting the value K_(n−1)_0 stored in the expanded key register for verification 151 and the values K_(n−1)_1, K_(n−1)_2 and K_(n−1)_3 that are outputs form the linear transformation circuit 150, as the expanded key for verification of the n-th round.

The data scrambler 102 performs arithmetic processes and verification processes by the processes described with reference to the flowchart of FIG. 4 by using the expanded key read from the expanded key register 121 and the expanded keys for verification supplied from the expanded key register for verification 151 and the linear transformation circuit 150.

Although an example in which the arithmetic device 130 performs the verification of the arithmetic operation of encryption or decryption through heterogeneous processing has been described above, the verification is not limited thereto. Specifically, this embodiment can also be similarly applied to a case where the verification of arithmetic operation of encryption and decryption is performed through homogeneous processing. This is obvious from the common configuration of the key scheduler 101 between the configuration of FIG. 1 where verification is performed through heterogeneous processing and the configuration of FIG. 5 where verification is performed through homogeneous processing.

As described above, according to this embodiment, it is sufficient that the expanded key register for verification 151 have a capacity allowing part of an expanded key to be stored, and the circuit size can thus be significantly reduced as compared to the case where the expanded key register for verification 122 having a capacity equal to that of the expanded key register 121 is provided as described with reference to FIGS. 1 and 5.

According to this embodiment, the linear transformation circuit 150 is newly added, and this linear transformation circuit 150 is formed by at most three exclusive OR circuits 152A, 152B and 152C. As is known, exclusive OR circuits can be realized with a very small configuration, and does not cancel out the effect that the capacity of the expanded key register for verification is reduced.

First Modified Example of this Embodiment

Figure 10:
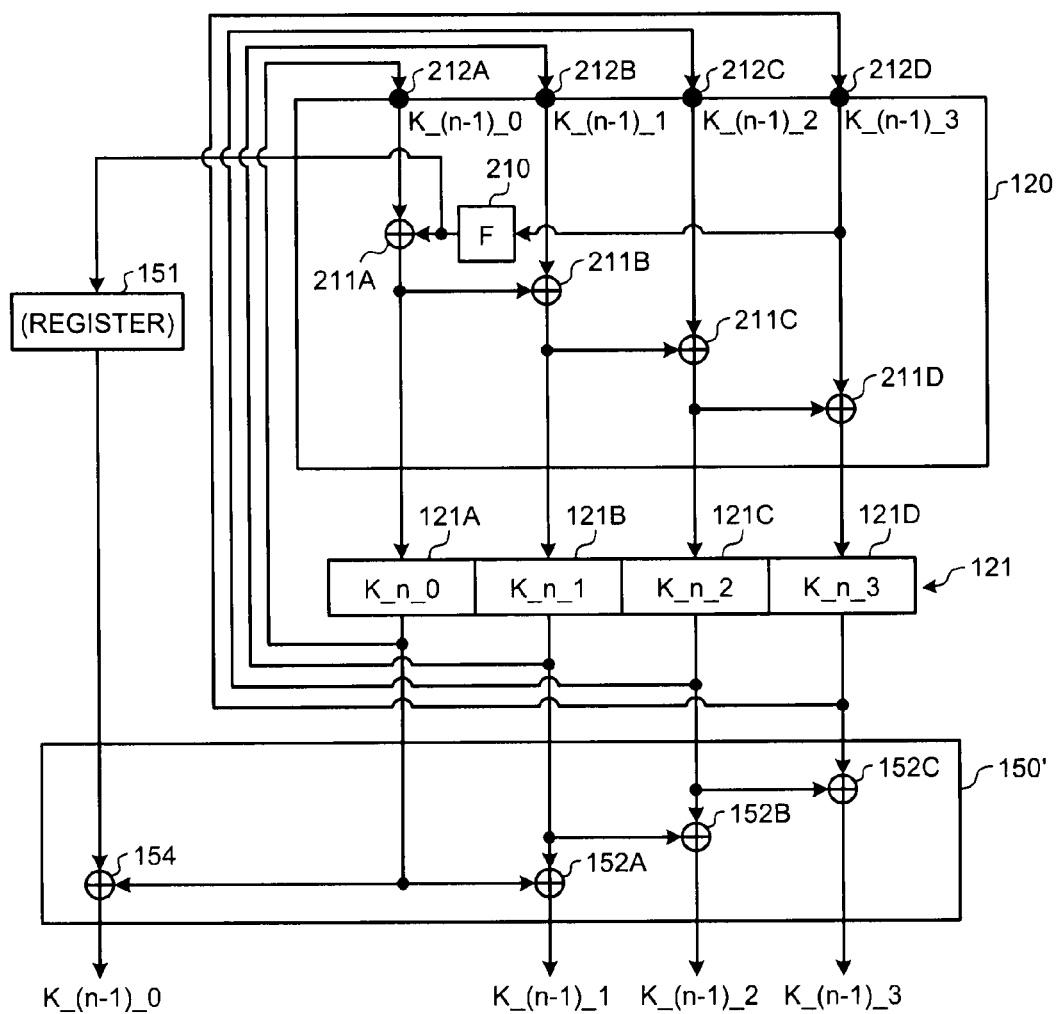
FIG. 10 is a diagram illustrating a configuration of a key scheduler according to a first modified example of the embodiment.

FIG. 10 illustrates an exemplary configuration of a key scheduler according to a first modified example of this embodiment. Note that parts that are the same as those in FIG. 8 described above will be designated by the same reference numerals in FIG. 10 and the detailed description thereof will not be repeated. In the first modified example of this embodiment, the expanded key register for verification 151 is connected to the other input terminal of the exclusive OR circuit 211A performing linear transformation directly on the transformation result of the non-linear circuit 210, that is, to the output of the non-linear transformation circuit 210.

Note that the expanded key generation circuit 120 generates the value $K\_n\_0$ of the expanded key by calculating an exclusive OR of the output of the non-linear transformation circuit 210 and the value $K\_(n-1)\_0$ of the expanded key of the (n−1)-th round input to the input terminal 212A. Accordingly, the data stored in the expanded key register for verification 151 needs to be subjected to similar processing so as to recover the data to a state of one round before.

Therefore, the linear transformation circuit 150' according to the first modified example of this embodiment has a configuration in which an exclusive OR circuit 154 is additionally provided as compared to the linear transformation circuit 150 according to the embodiment described above. The exclusive OR circuit 154 obtains an exclusive OR of the data held in the expanded key register for verification 151 and the value $K\_n\_0$ stored in the region 121A of the expanded key register 121. As a result, processes similar to those of the exclusive OR circuit 211A in the expanded key generation circuit 120 can be performed, and the value $K\_(n-1)\_0$ of one round before the value $K\_n\_0$ is output from the exclusive OR circuit 154.

Accordingly, in the n-th round, the value $K\_(n-1)\_0$ stored in the expanded key register for verification 151 and the values $K\_(n-1)\_1$, $K\_(n-1)\_2$ and $K\_(n-1)\_3$ that are outputs from the exclusive OR circuits 152A to 152C of the linear transformation circuit 150 are bit-connected to generate an expanded key of the (n−1)-th round having the value $K\_(n-1)$, namely the expanded key for verification of the n-th round.

In this manner, it is sufficient that the expanded key register for verification 151 have a capacity allowing an output of the non-linear transformation circuit 210 to be stored also in the first modified example of the first embodiment. In this case, similarly to the above, it is also sufficient that the expanded key register for verification 151 have a capacity of one fourth of that of the expanded key register 121.

According to the first modified example of this embodiment, the timing when data are stored in the expanded key register for verification 151 is coincident with the timing when the values $K\_n\_0$, $K\_n\_1$, $K\_n\_2$ and $K\_n\_3$ are stored in the regions 121A, 121B, 121C and 121D, respectively, of the expanded key register 121. Accordingly, this configuration is advantageous as compared to the configuration of FIG. 8 according to the embodiment described above in the synchronous timing of output of the values $K\_n\_0$, $K\_n\_1$, $K\_n\_2$ and $K\_n\_3$ of the expanded key from the linear transformation circuit 150'.

The key scheduler according to the first modified example of this embodiment can also obtain the expanded key of the n-th round and the expanded key for verification of the (n−1)-th round at the same time, and can thus be applied in place of the key scheduler 101 in the arithmetic device 100 illustrated in FIG. 1 similarly to the key scheduler 140 according to the embodiment described above. Needless to say, the key scheduler according to the first modified example of this embodiment can also be similarly applied to a case where the verification of arithmetic operation of encryption and decryption is performed through homogeneous processing.

Second Modified Example of this Embodiment

Next, a second modified example of this embodiment will be described. Although the linear transformation in the expanded key generation circuit 120 is performed by using the exclusive OR circuit in the description above, this is not limited to this example. For example, this embodiment can also be applied to a case where the linear transformation is implemented with another configuration in the expanded key generation circuit.

Figure 11:
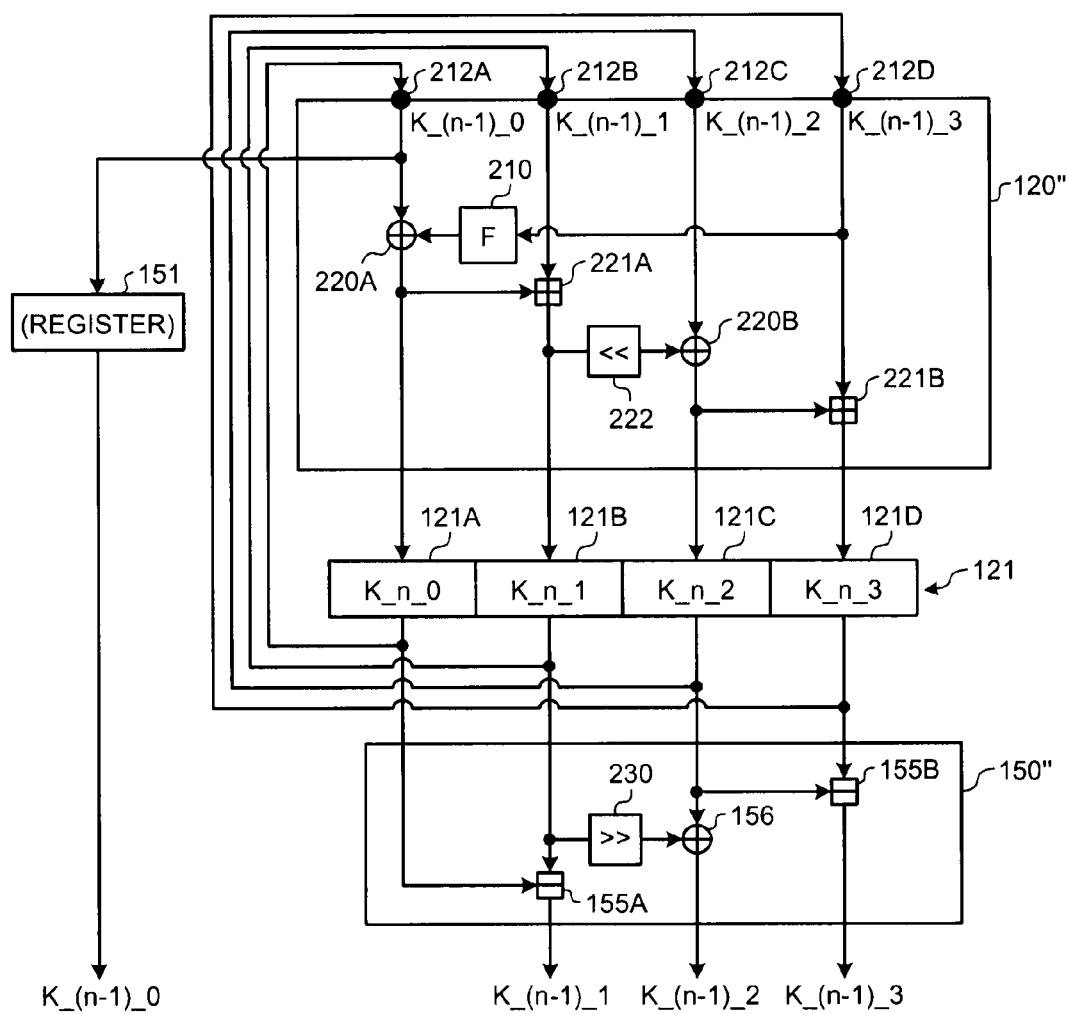
FIG. 11 is a diagram illustrating a configuration of a key scheduler according to a second modified example of the embodiment.

FIG. 11 illustrates an exemplary configuration of a key scheduler according to the second modified example of this embodiment. The key scheduler is an example of implementing linear transformation in an expanded key generation circuit 120" by using an adder circuit and a bit shift circuit. Note that parts that are the same as those in FIG. 8 described above will be designated by the same reference numerals in FIG. 11 and the detailed description thereof will not be repeated.

Specifically, to the expanded key generation circuit 120", values $K\_(n-1)\_0$, $K\_(n-1)\_1$, $K\_(n-1)\_2$ and $K\_(n-1)\_3$ obtained by dividing the expanded key of the (n−1)-th round into four are input to one input terminals of an exclusive OR circuit 220A, an adder circuit 221A, an exclusive OR circuit 220B and an adder circuit 221B via the input terminals 212A, 212B, 212C and 212D, respectively. In addition, the value $K\_(n-1)\_3$ is input to the non-linear transformation circuit 210. The value $K\_(n-1)\_3$ is subjected to non-linear transformation in the non-linear transformation circuit 210, and input to the other input terminal of the exclusive OR circuit 220A.

The exclusive OR circuit 220A calculates an exclusive OR of the value $K\_(n-1)\_0$ input to one input terminal and data resulting from non-linear transformation of the value $K\_(n-1)\_3$ input to the other input terminal, and outputs a value $K\_n\_0$. The value $K\_n\_0$ is stored in a region 121A of the expanded key register 121 and input to the other input terminal of the adder circuit 221A.

The adder circuit 221A adds the value $K\_(n-1)\_1$ input to one input terminal and the value $K\_n\_0$ input to the other input terminal, and outputs a value $K\_n\_1$. The value $K\_n\_1$ is stored in a region 121B of the expanded key register 121, left bit shifted by a bit shift circuit 222, and input to the other input terminal of the exclusive OR circuit 220B. The exclusive OR circuit 220B calculates an exclusive OR of the value $K\_(n-1)\_2$ input to one input terminal and the value $K\_n\_1$ input to the other input terminal, and outputs a value $K\_n\_2$. The value $K\_n\_2$ is stored in a region 121C of the expanded key register 121 and input to the other input terminal of the adder circuit 221B. The adder circuit 221B adds the value $K\_(n-1)\_3$ input to one input terminal and the value $K\_n\_2$ input to the other input terminal, and outputs a value $K\_n\_3$.

The value K_n_3 is stored in a region 121D of the expanded key register 121.

In the configuration of FIG. 11, the value K_n_1 stored in the region 121B can be regarded as a result of addition of the value K_n_0 stored in the region 121A and the value K_(n−1)_1 input to the input terminal 212B. Thus, the value K_(n−1)_1 input to the input terminal 212B can be obtained by subtracting the value K_n_0 from the value K_n_1.

The value K_n_2 stored in the region 121C can be regarded as an exclusive OR of the value K_n_1 stored in the region 121B and the value K_(n−1)_2 input to the input terminal 212C. Thus, the value K_(n−1)_2 input to the input terminal 212C can be obtained by calculating an exclusive OR of the value K_n_2 and the value K_n_1. Similarly, the value K_n_3 stored in the region 121D can be regarded as a result of addition of the value K_n_2 stored in the region 121C and the value K_(n−1)_3 input to the input terminal 212D. Thus, the value K_(n−1)_3 input to the input terminal 212D can be obtained by subtracting the value K_n_2 from the value K_n_3.

Accordingly, in the second modified example of this embodiment, a linear transformation circuit 150" for returning the expanded key stored in the expanded key register 121 by one round is configured by sequentially connecting a subtractor circuit 155A, a bit shift circuit 230 configured to perform right bit shift, an exclusive OR circuit 156 and a subtractor circuit 155B.

In such a configuration, the value K_n_0 stored in the region 121A of the expanded key register 121 is input to a subtrahend input terminal of the subtractor circuit 155A, and the value K_n_1 stored in the region 121B is input to a minuend input terminal of the subtractor circuit 155A. The subtractor circuit 155A subtracts the value K_n_0 from the value K_n_1 to obtain the value K_(n−1)_1 of the expanded key of the first round. In addition, the value K_n_1 stored in the region 121B of the expanded key register 121 is right bit shifted by the bit shift circuit 230 and input to one input terminal of the exclusive OR circuit 156, and the value K_n_2 stored in the region 121C is input to the other input terminals of the exclusive OR circuit 156. The exclusive OR circuit 156 calculates an exclusive OR of the values K_n_1 and K_n_2 to obtain the value K_(n−1)_2 of the expanded key of the (n−1)-th round. Furthermore, the value K_n_2 stored in the region 121C of the expanded key register 121 is input to a subtrahend input terminal of the subtractor circuit 155B, and the value K_n_3 stored in the region 121D is input to a minuend input terminal of the subtractor circuit 155B. The subtractor circuit 155B subtracts the value K_n_2 from the value K_n_3 to obtain the value K_(n−1)_3 of the expanded key of the first round.

In this manner, the values K_(n−1)_1, K_(n−1)_2 and K_(n−1)_3 composing the expanded key of the (n−1) round can be obtained by performing subtraction processes and exclusive OR processes on the values K_n_0, K_n_1, K_n_2 and K_n_3 of the expanded key of the n-th round stored in the regions 121A to 121D of the expanded key register 121.

On the other hand, the value K_(n−1)_0 input to the input terminal 212A is subjected to arithmetic operation including non-linear transformation by the non-linear transformation circuit 210. Accordingly, the value K_(n−1)_0 input to the input terminal 212A in the (n−1)-th round is stored in the expanded key register for verification 151 similarly to the embodiment described above. It is sufficient that the expanded key register for verification 151 have a capacity allowing the value K_(n−1)_0 to be stored, that is, a capacity of one fourth of that of the expanded key register 121.

In the n-th round, the value K_(n−1)_0 stored in the expanded key register for verification 151 and the values K_(n−1)_1, K_(n−1)_2 and K_(n−1)_3 that are outputs from the subtractor circuit 155A, the exclusive OR circuit 156 and the subtractor circuit 155B, respectively, of the linear transformation circuit 150" are bit-connected to generate an expanded key of the (n−1)-th round having the value K_(n−1), namely the expanded key for verification of the n-th round.

Accordingly, the capacity of the expanded key register can be reduced even in a case where the linear transformation performed in the expanded key generation circuit 120" is performed using means other than the exclusive OR such as addition and bit shift.

Note that although the expanded key register for verification 151 is connected to an input terminal 212A of the expanded key generation circuit 120" in the example of FIG. 11, this is not limited thereto. For example, the expanded key register for verification 151 can also be connected to an output of the non-linear transformation circuit 210 as in the first modified example of the embodiment described with reference to FIG. 10. In this case, an exclusive OR of data stored in the expanded key register for verification 151 and the value K_n_0 stored in the region 121A is calculated to obtain the value K_(n−1)_0 to be output similarly to FIG. 10.

The key scheduler according to the second modified example of this embodiment can also obtain the expanded key of the n-th round and the expanded key for verification of the (n−1)-th round at the same time, and can thus be applied in place of the key scheduler 101 in the arithmetic device 100 illustrated in FIG. 1 similarly to the key scheduler 140 according to the embodiment described above. Needless to say, the key scheduler according to the second modified example of this embodiment can also be similarly applied to a case where the verification of arithmetic operation of encryption and decryption is performed through homogeneous processing.

Third Modified Example of this Embodiment

Next, a third modified example of this embodiment will be described. Although the linear transformation in the expanded key generation circuit 120 is performed by using an exclusive OR circuit in the embodiment described above, the linear transformation may be performed by using one of other arithmetic circuits such as an adder circuit, a subtractor circuit and a bit shift circuit.

When the linear transformation is performed by adder circuits, the exclusive OR circuits 211A, 211B, 211C and 211D in the expanded key generation circuit 120 of FIG. 8 are replaced by adder circuits. In this case, the exclusive OR circuits 152A, 152B and 152C in the linear transformation circuit 150 may be replaced by subtractor circuits.

When the linear transformation is performed by subtractor circuits, the exclusive OR circuits 211A, 211B, 211C and 211D in the expanded key generation circuit 120 of FIG. 8 are replaced by subtractor circuits. In this case, the exclusive OR circuits 152A, 152B and 152C in the linear transformation circuit 150 may be replaced by adder circuits.

It is also possible to perform the linear transformation in the expanded key generation circuit 120 by using only bit shift circuits. In this case, in the linear transformation circuits 150, a bit shift circuit performing bit shift inverse to that of the bit shift circuit used in the expanded key generation circuit 120 is provided at a position corresponding to that of the bit shift circuit in the expanded key generation circuit 120.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key scheduling device configured to output a first key to be used for verification of an arithmetic operation, the key scheduling device comprising:
   a non-linear transformation circuit that non-linearly transforms at least one of partial keys resulting from dividing an expanded key;
   a first linear transformer circuit that includes a plurality of sub-circuits, each of which linearly transforms the partial key resulting from dividing the expanded key, wherein a first sub-circuit of the plurality of sub-circuits linearly transforms the partial key resulting from dividing the expanded key, by directly using a transformation result from the non-linear transformation circuit;
   a first storage that stores the partial key linearly transformed by the first linear transformer circuit;
   a second linear transformer circuit that linearly transforms, inversely to the first linear transformer circuit, each of partial keys other than the partial key linearly transformed by the first sub-circuit out of partial keys stored in the first storage, and outputs inversely transformed partial keys;
   a second storage that stores one partial key of the at least one partial keys input to the first sub-circuit; and
   an outputting unit implemented by circuitry that connects the respective inversely transformed partial keys and the one partial key stored in the second storage to be output as the first key to be used for the verification of the arithmetic operation.

2. The key scheduling device according to claim 1, wherein the first linear transformer circuit and the second linear transformer circuit are formed using at least one of an exclusive OR circuit, a bit shift circuit, an adder circuit and a subtractor circuit.

3. The key scheduling device according to claim 2, wherein the second storage stores the partial key input to the second circuit.

4. The key scheduling device according to claim 2, wherein the second storage stores the transformation result from the non-linear transformation circuit, and
   the second linear transformer circuit further linearly transforms, inversely to the first linear transformer circuit, the transformation result stored in the second storage.

5. A key scheduling method for outputting a first key to be used for verification of an arithmetic operation, the key scheduling method comprising:
   non-linearly transforming at least one of partial keys resulting from dividing an expanded key;
   first linearly transforming, by a first linear transformer circuit, the non-linearly transformed partial key by directly using a transformation result of the non-linear transformation;
   storing the partial key linearly transformed by the first linearly transforming in a first storage;
   second linearly transforming, inverse to the first linearly transforming, each of partial keys, other than the partial key linearly transformed by a sub-circuit of a plurality of sub-circuits included in the first linear transformer circuit, out of partial keys stored in the first storage;
   storing in a second storage one partial key of the at least one partial keys input to the first sub-circuit; and
   connecting the respective inversely transformed partial keys and the one partial key stored in the second storage to be output as the first key to be used for the verification of the arithmetic operation.

* * * * *